US011926881B2

(12) United States Patent
Tanaka et al.

(10) Patent No.: US 11,926,881 B2
(45) Date of Patent: Mar. 12, 2024

(54) HIGH-STRENGTH COLD-ROLLED STEEL SHEET AND METHOD FOR MANUFACTURING THE SAME

(71) Applicant: JFE STEEL CORPORATION, Tokyo (JP)

(72) Inventors: Yuji Tanaka, Tokyo (JP); Hidekazu Minami, Tokyo (JP); Naoki Takayama, Tokyo (JP); Takako Yamashita, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 3 days.

(21) Appl. No.: 17/636,714

(22) PCT Filed: Jun. 19, 2020

(86) PCT No.: PCT/JP2020/024158
§ 371 (c)(1),
(2) Date: Feb. 18, 2022

(87) PCT Pub. No.: WO2021/033407
PCT Pub. Date: Feb. 25, 2021

(65) Prior Publication Data
US 2022/0340989 A1    Oct. 27, 2022

(30) Foreign Application Priority Data
Aug. 20, 2019    (JP) ................. 2019-150166

(51) Int. Cl.
| *C21D 9/46* | (2006.01) |
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/10* | (2006.01) |
| *C22C 38/12* | (2006.01) |
| *C22C 38/16* | (2006.01) |
| *C22C 38/28* | (2006.01) |
| *C22C 38/32* | (2006.01) |
| *C22C 38/38* | (2006.01) |
| *C23C 2/28* | (2006.01) |
| *C23C 2/40* | (2006.01) |

(52) U.S. Cl.
CPC .............. *C21D 9/46* (2013.01); *B32B 15/013* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/02* (2013.01); *C22C 38/06* (2013.01); *C22C 38/08* (2013.01); *C22C 38/10* (2013.01); *C22C 38/12* (2013.01); *C22C 38/16* (2013.01); *C22C 38/28* (2013.01); *C22C 38/32* (2013.01); *C22C 38/38* (2013.01); *C23C 2/29* (2022.08); *C23C 2/40* (2013.01); *C21D 2211/002* (2013.01); *C21D 2211/008* (2013.01); *Y10T 428/12799* (2015.01)

(58) Field of Classification Search
None
See application file for complete search history.

(56) References Cited

U.S. PATENT DOCUMENTS

| 2011/0168301 A1* | 7/2011 | Song ................. C22C 38/02 148/330 |
| 2014/0322559 A1 | 10/2014 | Becker et al. |
| 2018/0135145 A1* | 5/2018 | Suwa ................. C22C 38/04 |
| 2018/0135155 A1 | 5/2018 | Suwa et al. |
| 2019/0032185 A1 | 1/2019 | Yoshitomi et al. |
| 2020/0190612 A1* | 6/2020 | Kwak ................. C21D 8/0236 |

FOREIGN PATENT DOCUMENTS

| CN | 104093873 A | 10/2014 |
| CN | 105940134 A | 9/2016 |
| EP | 2 524 970 A1 | 11/2012 |
| EP | 2 559 782 A1 | 2/2013 |
| EP | 2 811 047 A1 | 12/2014 |
| EP | 3 101 147 A1 | 12/2016 |
| EP | 3 282 031 A1 | 2/2018 |
| EP | 3 556 896 A1 | 10/2019 |
| JP | 2007-077495 A | 3/2007 |
| JP | 2008-106351 A | 5/2008 |
| JP | 2009/263686 A | 11/2009 |
| JP | 2011-153336 A | 8/2011 |
| JP | 2013-072101 A | 4/2013 |

(Continued)

OTHER PUBLICATIONS

May 18, 2022 Office Action issued in Chinese Patent Application No. 202080058625.7.
Sep. 15, 2020 International Search Report issued in International Patent Application No. PCT/JP2020/024158.
Sep. 29, 2022 Extended European Search Report issued in European Patent Application No. 20855132.5.

Primary Examiner — Seth Dumbris
(74) Attorney, Agent, or Firm — Oliff PLC

(57) ABSTRACT

A high-strength cold-rolled steel sheet having a high yield ratio and excellent stretch flangeability and a method for manufacturing the steel sheet. The high-strength cold-rolled steel sheet has a chemical composition including, by mass %, C: 0.10 to 0.30%, Si: 0.50 to 2.00%, Mn: 2.5 to 4.0%, P: 0.050% or less, S: 0.020% or less, Al: 0.10% or less, N: 0.01% or less, Ti: 0.100% or less, and B: 0.0003 to 0.0030%, with the balance being Fe and incidental impurities. N and Ti satisfy a specified formula, and the total area fraction of martensite and bainite is 95% or more. The number density of bainite grains having an area of 3 $\mu m^2$ or more and a carbon concentration of less than 0.7C is 1200 grains/$mm^2$ or less.

16 Claims, No Drawings

(56) References Cited

FOREIGN PATENT DOCUMENTS

| | | |
|---|---|---|
| JP | 2013-147736 A | 8/2013 |
| JP | 2014-196557 A | 10/2014 |
| JP | 2015-014026 A | 1/2015 |
| KR | 20130069699 A | 6/2013 |
| WO | 2016/163467 A1 | 10/2016 |
| WO | 2017/131055 A1 | 8/2017 |
| WO | 2018/110867 A1 | 6/2018 |
| WO | 2018/124157 A1 | 7/2018 |

* cited by examiner

HIGH-STRENGTH COLD-ROLLED STEEL SHEET AND METHOD FOR MANUFACTURING THE SAME

TECHNICAL FIELD

This application relates to a high-strength cold-rolled steel sheet particularly suitable for parts of structural members of automobiles etc.

BACKGROUND

In recent years, increasing environmental concerns have led to stringent $CO_2$ emission regulations. One issue in the field of automobiles is a reduction in weight of vehicle bodies for the purpose of improving fuel economy. Therefore, automotive parts are being reduced in thickness by using high-strength steel sheets. In particular, high-strength steel sheets having a tensile strength (TS) of 1180 MPa or more are being increasingly used.

High-strength steel sheets used for structural parts and reinforcing parts of automobiles are required not only to have high strength but also to have good workability. In particular, since parts having complicated shapes are subjected to stretch flanging, high-strength steel sheets having good stretch flangeability (hereinafter may be referred to as hole expandability) are required for these parts. Moreover, from the viewpoint of crash safety of automobiles, some parts are required not only to have high strength but also to have high deformation resistance in order to maintain a living space of passengers in case of a crash. It is therefore desirable to use high-yield ratio steel sheets for such automotive parts.

Generally, strengthening of steel sheets leads to deterioration in formability (ductility, deep drawability, and stretch flangeability). Therefore, the strengthening of steel sheets may disadvantageously cause cracking of the steel sheets during forming. In particular, it is quite difficult to increase the stretch flangeability of a high-strength steel sheet having a TS of 1180 MPa or more additionally without a reduction in tensile strength. There is therefore a need for development of high-strength steel sheets having a TS of 1180 MPa or more and also having a high yield ratio and excellent stretch flangeability.

Patent Literature 1 discloses a high-strength steel sheet having a bainite-martensite microstructure containing martensite at an area fraction of 15 to 50% and having a TS of 980 MPa or more, a high yield ratio, and excellent workability and also discloses a method for manufacturing the high-strength steel sheet. Patent Literature 2 discloses a high-strength cold-rolled steel sheet having a metallographic microstructure including ferrite and a hard secondary phase at an area fraction of 1 to 30% and having a yield ratio of 0.70 or more and also discloses a method for manufacturing the steel sheet.

CITATION LIST

Patent Literature

PTL 1: Japanese Unexamined Patent Application Publication No. 2013-147736

PTL 2: Japanese Unexamined Patent Application Publication No. 2008-106351

SUMMARY

Technical Problem

However, the TS of each of the steel sheets disclosed in Patent Literature 1 and Patent Literature 2 is less than 1180 MPa, and no consideration is given to stretch flangeability.

The disclosed embodiments have been made in view of the above circumstances, and it is an object to provide a high-strength cold-rolled steel sheet having a high yield ratio and excellent stretch flangeability and to provide a method for manufacturing the high-strength cold-rolled steel sheet. The high yield ratio in the disclosed embodiments means that the yield ratio (YR) is 70% or more. The excellent stretch flangeability in the disclosed embodiments means that a hole expansion ratio λ, which is an indicator of stretch flangeability, is 30% or more.

Solution to Problem

To solve the foregoing problem, the present inventors have conducted extensive studies. As a result of the studies, the inventors have found that a steel sheet containing hard martensite as a principal microstructure can have a TS of 1180 MPa or more and also found that excellent stretch flangeability can be obtained by reducing the type of phases other than the martensite to obtain substantially a martensite single phase. However, even when the microstructure is a martensite single-phase microstructure, the stretch flangeability and the YR are lower than the desired values in some cases.

Accordingly, the inventors have conducted further studies on the relation between the microstructure of a steel sheet and its mechanical properties. As for the microstructure of a steel sheet, the martensite microstructure has conventionally been identified by etching the steel sheet with, for example, nital and observing the steel sheet under a scanning electron microscope (SEM). The inventors have measured the details of the element distribution in the microstructure identified as martensite by the above method using an electron probe micro analyzer (EPMA) and found that, even when the steel sheet has been identified as having substantially a martensite single-phase microstructure, the steel sheet has a region in which the distribution of carbon in the microstructure is non-uniform. In the microstructure in which the carbon distribution is non-uniform, a region whose carbon concentration is lower than that therearound is thought to be a bainite microstructure. However, with the conventional microstructure identification method using an SEM, it is very difficult to distinguish the bainite microstructure in martensite because the appearance of the bainite microstructure is very similar to the appearance of the martensite.

To examine the distribution of carbon in a steel sheet microscopically and quantitatively, the inventors have mirror-polished a cross section of a specimen and determined carbon mapping using an EPMA to thereby examine the relation between the microstructure of the steel sheet and its mechanical properties. Then the inventors have found that the stretch flangeability of a steel sheet and its yield ratio are improved when the ratio of coarse bainite grains having an area of 3 $\mu m^2$ or more in a bainite microstructure with a low carbon concentration is equal to or less than a prescribed value.

The disclosed embodiments have been made based on the above findings and is summarized as follows.

[1] A high-strength cold-rolled steel sheet having a chemical composition containing, in mass %, C: 0.10 to 0.30%,
Si: 0.50 to 2.00%,
Mn: 2.5 to 4.0%,
P: 0.050% or less,
S: 0.020% or less,
Al: 0.10% or less,
N: 0.01% or less,
Ti: 0.100% or less, and
B: 0.0003 to 0.0030%,
with the balance being Fe and incidental impurities,
wherein N and Ti satisfy formula (1) below,
wherein the total area fraction of martensite and bainite is 95% or more, and
wherein the number density of bainite grains having an area of 3 μm² or more and a carbon concentration of less than 0.7[C] are 1200 grains/mm² or less:

$$([N]/14)/([Ti]/47.9)<1, \tag{1}$$

where [C], [N], and [Ti] are the contents (% by mass) of C, N, and Ti, respectively.

[2] The high-strength cold-rolled steel sheet according to [1], wherein the chemical composition further contains, in mass %, one or two or more selected from
Nb: 0.001 to 0.020%,
V: 0.001 to 0.100%,
Mo: 0.010 to 0.500%,
Cr: 0.01 to 1.00%,
Cu: 0.01 to 1.00%,
Ni: 0.01 to 0.50%,
Ca: 0.0001 to 0.0200%, and
REM: 0.0001 to 0.0200%.

[3] The high-strength cold-rolled steel sheet according to [1], wherein the chemical composition further contains, in mass %, one or two or more selected from
Nb: 0.020% or less,
V: 0.100% or less,
Mo: 0.500% or less,
Cr: 1.00% or less,
Cu: 1.00% or less,
Ni: 0.50% or less,
Ta: 0.100% or less,
W: 0.500% or less,
Sn: 0.200% or less,
Sb: 0.200% or less,
Co: 0.100% or less,
Zr: 0.0200% or less,
Ca: 0.0200% or less,
Mg: 0.0200% or less, and
REM: 0.0200% or less.

[4] The high-strength cold-rolled steel sheet according to any one of [1] to [3], wherein the high-strength cold-rolled steel sheet has a galvanized layer on a surface thereof.

[5] A method for manufacturing a high-strength cold-rolled steel sheet, the method including:
a hot rolling step of subjecting a steel material having the chemical composition according to any of [1] to [3] to hot rolling to thereby obtain a hot-rolled steel sheet; a pickling step of subjecting the hot-rolled steel sheet to pickling; a cold rolling step of subjecting the pickled hot-rolled steel sheet to cold rolling to thereby obtain a cold-rolled steel sheet;
an annealing step of annealing the cold-rolled steel sheet at an annealing temperature of 950 to 1200° C.; and
a cooling step of starting cooling from the annealing temperature, the cooling being performed at an average cooling rate of 15° C./s or higher in a temperature range of from Ar3 temperature or higher to Ms temperature or lower.

[6] A method for manufacturing a high-strength cold-rolled steel sheet, the method including:
a hot rolling step of subjecting a steel material having the chemical composition according to any of [1] to [3] to hot rolling to thereby obtain a hot-rolled steel sheet; a pickling step of subjecting the hot-rolled steel sheet to pickling; a cold rolling step of subjecting the pickled hot-rolled steel sheet to cold rolling to thereby obtain a cold-rolled steel sheet;
an annealing step of annealing the cold-rolled steel sheet at an annealing temperature of 950 to 1200° C.;
a first cooling step of starting cooling from the annealing temperature, the cooling being performed at an average cooling rate of 15° C./s or higher in a temperature range of from Ar3 temperature or higher to 450° C.;
a galvanizing step of subjecting the cooled cold-rolled steel sheet to galvanizing treatment; and
a second cooling step of, after the galvanizing step, performing cooling at an average cooling rate of 15° C./s or higher in a temperature range of Ms temperature or lower.

[7] The method for manufacturing a high-strength cold-rolled steel sheet according to [6], the method further including a galvannealing step of, after the galvanizing step but before the second cooling step, performing galvannealing treatment.

Advantageous Effects

According to the disclosed embodiments, a high-strength cold-rolled steel sheet having a tensile strength of 1180 MPa or more, a high yield ratio, and excellent stretch flangeability can be obtained. When the high-strength cold-rolled steel sheet of the disclosed embodiments is applied to, for example, an automobile structural member, crash safety is obtained, and an improvement in fuel economy due to a reduction in vehicle body weight can be achieved.

DETAILED DESCRIPTION

[Chemical Composition]
First, the chemical composition of the steel sheet of the disclosed embodiments will be described. "%" representing the content of a component is "% by mass," unless otherwise specified.
C: 0.10 to 0.30%
C is an important element in the disclosed embodiments. The tensile strength of a steel sheet that has undergone martensitic transformation is determined by the amount of solute C. C has the effect of significantly lowering the martensitic transformation temperature (Ms temperature) of the steel sheet. If the content of C is less than 0.10%, a tensile strength of 1180 MPa or more cannot be obtained. Moreover, since the Ms temperature is high, austenite is unstable, and ferrite grains and coarse bainite grains tend to be formed through ferrite transformation and bainite transformation, so that the yield ratio and stretch flangeability of the steel sheet deteriorate. Therefore, the content of C is set to 0.10% or more and is preferably 0.11% or more. If the content of C exceeds 0.30%, retained austenite is formed excessively, and the stretch flangeability and the yield ratio deteriorate. Therefore, the content of C is set to 0.30% or less and is preferably 0.28% or less.
Si: 0.50 to 2.00%
Si is necessary to prevent the formation of carbides in martensite to thereby obtain sufficient strength. If the content of Si is less than 0.50%, a tensile strength of 1180 MPa or more cannot be obtained. Therefore, the content of Si is set to 0.50% or more and is preferably 0.60% or more. If the content of Si exceeds 2.00%, not only its effect is saturated, but also galvanizability deteriorates. Therefore, the content of Si is set to 2.00% or less and is preferably 1.8% or less.

Mn: 2.5 to 4.0%

Mn is an element important for increasing the hardenability of the steel and obtaining the martensite microstructure. If the content of Mn is less than 2.5%, ferrite transformation and coarse bainite transformation tend to occur, and the strength, the yield ratio, and the stretch flangeability deteriorate. Therefore, the content of Mn is set to 2.5% or more and is preferably 2.7% or more. If the content of Mn exceeds 4.0%, excessive hardening occurs, and this causes difficulty in performing cold rolling. Therefore, the content of Mn is set to 4.0% or less and is preferably 3.8% or less.

P: 0.050% or Less

P is an element contained in the cold-rolled steel sheet as an incidental impurity and causes deterioration in the stretch flangeability and weldability of the cold-rolled steel sheet. Therefore, the content of P is set to 0.050% or less. The lower the content of P, the better. Therefore, no particular limitation is imposed on the lower limit of the content of P, and the content of P may be 0% or more and may be more than 0%. However, an excessive reduction in the content of P causes an increase in the cost of manufacturing. Therefore, from the viewpoint of the manufacturing cost, the content of P is preferably 0.001% or more.

S: 0.020% or Less

S is an element contained in the cold-rolled steel sheet as an incidental impurity and causes deterioration in the stretch flangeability and the weldability. Therefore, the content of S is set to 0.020% or less. The lower the content of S, the better. Therefore, no particular limitation is imposed on the lower limit of the content of S, and the content of S may be 0% or more and may be more than 0%. However, an excessive reduction in the content of S causes an increase in the manufacturing cost. Therefore, from the viewpoint of the manufacturing cost, the content of S is preferably 0.0001% or more.

Al: 0.10% or Less

Al is an element acting as a deoxidizing agent and is commonly used for a molten steel deoxidization process. To obtain the effect as the deoxidizing agent, the content of Al is preferably 0.005% or more. However, if the content of Al exceeds 0.10%, ferrite tends to be formed, and the desired tensile strength is not obtained. Therefore, the content of Al is set to 0.10% or less and is preferably 0.06% or less.

N: 0.01% or Less

N forms nitrides and causes a reduction in stretch flangeability. Moreover, N forms BN and causes a reduction in hardenability. Therefore, the content of N is set to 0.01% or less. The lower the content of N, the better. However, from the viewpoint of the manufacturing cost, the content of N is preferably 0.0001% or more.

Ti: 0.100% or Less

Ti can fix N in the steel as TiN to thereby reduce the formation of BN that causes deterioration in hardenability. However, if the content of Ti exceeds 0.100%, Ti carbide is formed. The Ti carbide has a pinning effect that inhibits the growth of austenite grains in the annealing step after cold rolling described later and therefore reduces the diameter of the austenite grains, so that the surface area of the grain boundaries increases. In this case, the concentration of B segregated at the grain boundaries is reduced, and the area of austenite grain boundaries serving as nucleation sites of bainite increases. This causes the formation of coarse bainite in the subsequent cooling step, and the stretch flangeability and the yield ratio decrease. Therefore, the content of Ti is set to 0.100% or less and is preferably 0.040% or less. From the viewpoint of fixing N as TiN in a reliable manner, the content of Ti is preferably 0.005% or more.

B: 0.0003 to 0.0030%

B segregates at the austenite grain boundaries to prevent the formation of ferrite and a coarse bainite microstructure from the grain boundaries during cooling and can therefore improve hardenability. Therefore, B is an element necessary for obtaining desired martensite and bainite microstructures. If the content of B is less than 0.0003%, the desired martensite and bainite microstructures are not obtained and ferrite and a coarse bainite microstructure are formed, so that the yield ratio and the stretch flangeability deteriorate. Therefore, the content of B is set to 0.0003% or more and is preferably 0.0006% or more. However, if the content of B exceeds 0.0030%, carboborides are formed, and the stretch flangeability decreases. Moreover, rolling resistance increases, so that hot rolling and cold rolling are difficult to be performed. Therefore, the content of B is set to 0.0030% or less. The content of B is preferably 0.0020% or less.

Moreover, in the disclosed embodiments, N and Ti are contained such that the following formula (1) is satisfied.

$$([N]/14)/([Ti]/47.9)<1 \tag{1}$$

Here, [N] and [Ti] are contents (% by mass) of N and Ti, respectively.

When N is bonded to B to form BN, not only the stretch flangeability deteriorates, but also the effect of B that improves the hardenability is impaired. Therefore, N in the steel is fixed by Ti. To obtain this effect, the content of N (molar fraction) is set to be smaller than the content of Ti (molar fraction). If ([N]/14)/([Ti]/47.9) 1, excess N forms BN, and the effect of B that improves the hardenability is not obtained, so that the stretch flangeability and the yield ratio deteriorate.

The balance is Fe and incidental impurities.

In the disclosed embodiments, the steel sheet may optionally contains, in addition to the above components, at least one of elements described below. By adding any of these optional elements, the characteristics such as the tensile strength, the stretch flangeability, and the yield ratio can be further improved.

Nb: 0.001 to 0.020%

Nb forms a fine carbide during hot rolling or annealing and has the effect of increasing the strength of the steel sheet. When Nb is added, the content of Nb is preferably 0.001% or more to obtain the above effect. However, if the content of Nb exceeds 0.020%, the growth of austenite grains during annealing is inhibited, and a coarse bainite microstructure is formed in the subsequent cooling step, so that the stretch flangeability and the yield ratio deteriorate. Therefore, when Nb is added, the content of Nb is set to 0.020% or less and is more preferably 0.015% or less.

V: 0.001 to 0.100%

Like Nb, V forms a fine carbide during hot rolling or annealing and has the effect of increasing the strength of the steel sheet. When V is added, the content of V is preferably 0.001% or more to obtain the above effect. However, if the content of V exceeds 0.100%, C in the steel precipitates as V carbide. In this case, the hardenability decreases, and the desired tensile strength is not obtained. Therefore, when V is added, the content of V is set to 0.100% or less and is more preferably 0.080% or less.

Mo: 0.010 to 0.500%

Mo has the effect of increasing the hardenability and inhibiting the formation of ferrite and a coarse bainite microstructure. When Mo is added, the content of Mo is preferably 0.010% or more to obtain the above effect. However, if the content of Mo exceeds 0.500%, C in the steel precipitates as Mo carbide. In this case, the hardenability decreases, and the desired tensile strength is not obtained. Therefore, when Mo is added, the content of Mo is set to 0.500% or less and is more preferably 0.400% or less.

Cr: 0.01 to 1.00%

Cr has the effect of improving the hardenability of the steel. When Cr is added, the content of Cr is preferably 0.01% or more to obtain the above effect. However, if the content of Cr exceeds 1.00%, coarse Cr carbide is formed, and the stretch flangeability decreases. Therefore, when Cr is added, the content of Cr is set to 1.00% or less and is more preferably 0.8% or less.

Cu: 0.01 to 1.00%

Cu has the effect of further increasing the strength through solid solution strengthening and improving the weather resistance of the cold-rolled steel sheet. When Cu is added, the content of Cu is preferably 0.01% or more to obtain the above effect. However, if the content of Cu exceeds 1.00%, intergranular cracking tends to occur, and the manufacturing yield and productivity decrease. Therefore, when Cu is added, the content of Cu is set to 1.00% or less and is more preferably 0.5% or less.

Ni: 0.01 to 0.50%

Ni is an element that improves the hardenability and the weather resistance. Ni also improves hot shortness when Cu is added. When Ni is added, the content of Ni is preferably 0.01% or more to obtain the above effect. However, if the content of Ni exceeds 0.50%, an excessively large amount of retained austenite is formed, and the yield ratio becomes lower than the desired value. Therefore, when Ni is added, the content of Ni is set to 0.50% or less and is more preferably 0.4% or less.

Ta: 0.100% or Less

Like Nb, Ta forms a fine carbide and has the effect of increasing the strength of the steel sheet. When Ta is added, the content of Ta is preferably 0.001% or more to obtain the above effect. However, if the content of Ta exceeds 0.100%, C in the steel precipitates as Ta carbide. In this case, the hardenability decreases, and the desired tensile strength is not obtained. Therefore, when Ta is added, the content of Ta is set to 0.100% or less and is more preferably 0.050% or less.

W: 0.500% or Less

W has the effect of increasing the strength of the steel sheet through solid solution strengthening. When W is added, the content of W is preferably 0.005% or more to obtain the above effect. However, if the content of W exceeds 0.500%, C in the steel precipitates as W carbide. In this case, the hardenability decreases, and the desired tensile strength is not obtained. Therefore, when W is added, the content of W is set to 0.500% or less and is more preferably 0.300% or less.

Sn: 0.200% or Less

Sn has the effect of preventing oxidation, nitriding, and decarbonization of the surface of steel sheet. When Sn is added, the content of Sn is preferably 0.001% or more to obtain the above effect. However, if the content of Sn exceeds 0.200%, the above effect is saturated. Therefore, when Sn is added, the content of Sn is set to 0.200% or less and is more preferably 0.040% or less.

Sb: 0.200% or Less

Like Sn, Sb has the effect of preventing oxidation, nitriding, and decarbonization of the surface of steel sheet. When Sb is added, the content of Sb is preferably 0.001% or more to obtain the above effect. However, if the content of Sb exceeds 0.200%, the above effect is saturated. Therefore, when Sb is added, the content of Sb is set to 0.200% or less and is more preferably 0.040% or less.

Co: 0.100% or Less

Co has the effect of increasing the strength of the steel sheet through solid solution strengthening. When Co is added, the content of Co is preferably 0.005% or more to obtain the above effect. However, if the content of Co exceeds 0.100%, the above effect is saturated. Therefore, when Co is added, the content of Co is set to 0.100% or less and is more preferably 0.080% or less.

Zr: 0.0200% or Less

Zr can be used as a deoxidizing agent. When Zr is added, the content of Zr is preferably 0.0001% or more to obtain the above effect. If the content of Zr exceeds 0.0200%, C in the steel precipitates as Zr carbide. In this case, the hardenability decreases, and the desired tensile strength is not obtained. Therefore, when Zr is added, the content of Zr is set to 0.0200% or less and is more preferably 0.0150% or less.

Ca: 0.0001 to 0.0200%

Ca can be used as a deoxidizing agent. When Ca is added, the content of Ca is preferably 0.0001% or more to obtain the above effect. However, if the content of Ca exceeds 0.0200%, a large amount of Ca-based inclusions are formed, and the stretch flangeability decreases. Therefore, when Ca is added, the content of Ca is set to 0.0200% or less and is more preferably 0.0150% or less.

Mg: 0.0200% or Less

Mg can be used as a deoxidizing agent. When Mg is added, the content of Mg is preferably 0.0001% or more to obtain the above effect. However, if the content of Mg exceeds 0.0200%, a large number of Mg-based inclusions are formed, and the stretch flangeability decreases. Therefore, when Mg is added, the content of Mg is set to 0.0200% or less and is more preferably 0.0150% or less.

REM: 0.0001 to 0.0200%

REM cause inclusions to have spherical shapes to reduce the number of starting points of voids and therefore have the effect of improving the stretch flangeability. When REM are added, the content of REM is preferably 0.0001% or more to obtain the above effect. However, if the content of REM exceeds 0.0200%, a large number of coarse precipitates are formed, and the stretch flangeability rather decreases. Therefore, when REM are added, the content of REM is set to 0.0200% or less and is more preferably 0.0100% or less.

[Microstructure of Steel Sheet]

Next, the microstructure of the cold-rolled steel sheet will be described. The cold-rolled steel sheet in the present embodiment of the disclosed embodiments has a steel structure in which the total area fraction of martensite and bainite is 95% or more and in which the number density of bainite grains having an area of 3 $\mu m^2$ or more and a carbon concentration of less than 0.7[C] are 1200 grains/mm$^2$ or less. Here, [C] is the content (% by mass) of C. The values of the microstructure of the steel sheet of the disclosed embodiments mean values at a position located at ¼ of the thickness of the steel sheet. The area fraction of a microstructure in the disclosed embodiments can be measured by mirror-polishing a cross section of the steel sheet that is parallel to the rolling direction, etching the cross section with 3% nital, and observing a position located at ¼ of the thickness under an SEM. More specifically, the area fraction can be determined using a method described in Examples. The bainite grains having an area of 3 μm² or more and a carbon concentration of less than 0.70[C] can be identified by mirror-polishing a cross section of the steel sheet that is parallel to the rolling direction, removing hydrocarbon-based stains on the surface of the specimen using a plasma cleaner, then determining a carbon mapping image using an EPMA, and performing image analysis. More specifically, the bainite grains can be identified using a method described in Examples.

Total Area Fraction of Martensite and Bainite: 95% or More

In the disclosed embodiments, martensite and bainite are a primary phase in the microstructure of the steel sheet of the disclosed embodiments and serve as a hard phase. To obtain the desired stretch flangeability and tensile strength, it is desirable that the area fraction of ferrite and retained austenite, which are soft phases, is small. Therefore, the total area fraction of martensite and bainite with respect to the total area of the microstructure is 95% or more and preferably 96% or more.

Number Density of Bainite Grains Having Area of 3 μm² or More and Carbon Concentration of Less than 0.70[C]: 1200 Grains/Mm² or Less In the primary phase microstructure, a microstructure having a carbon concentration of less than 0.70[C] is bainite. When a certain number or more of coarse bainite grains having an area exceeding 3 μm² are present in the bainite, the yield ratio and the stretch flangeability deteriorate. Although the reason for this is unclear, the reason may be as follows. The yield strength of the coarse bainite grains themselves is small, and therefore the coarse bainite grains yield earlier than martensite. Therefore, as the number of coarse bainite grains increases, the yield ratio decreases. Moreover, the difference in hardness between martensite and the coarse bainite grains is large. This may cause a reduction in stretch flangeability. Bainite grains having an area of less than 3 μm² may have a yield strength close to that of martensite because of a strengthening mechanism due to crystal grain refinement. Therefore, the presence of these bainite grains does not adversely affect the stretch flangeability and the yield ratio. Thus, to obtain the desired yield ratio and stretch flangeability, it is necessary that the number density of coarse bainite grains having an area of 3 μm² or more be 1200 grains/mm² or less.

In the disclosed embodiments, additional phases other than martensite and bainite may be contained. The lower the area fraction of the additional phases, the more preferred. However, when the area fraction of the additional phases is 5% or less, their effects are negligible. The additional phases (remaining phases) may be identified by, for example, SEM observation.

The chemical composition of the high-strength steel sheet of the disclosed embodiments and its steel structure are as described above.

The high-strength steel sheet of the disclosed embodiments may further have a galvanized layer on the surface of the steel sheet. The type of galvanized layer is preferably a hot-dip galvanized layer. The galvanized layer may be a galvannealed layer (a hot-dip galvannealed layer).

[Manufacturing Method]

Next, a method for manufacturing the cold-rolled steel sheet of the disclosed embodiments will be described. The cold-rolled steel sheet in the preceding embodiment of the disclosed embodiments can be manufactured by sequentially subjecting a steel material having the above-described chemical composition to a hot rolling step, a pickling step, a cold rolling step, an annealing step, and a cooling step. When the cold-rolled steel sheet is subjected to galvanization, a first cooling step, a galvanizing step, and a second cooling step are sequentially performed after the annealing step.

Conditions in each step will next be described. The temperature of a material to be treated (a steel material or a hot-rolled steel sheet) is its surface temperature, unless otherwise specified.

Steel Material

Any steel material having the above-described chemical composition can be used. The chemical composition of the finally obtained cold-rolled steel sheet is the same as the chemical composition of the steel material used. The steel material used may be a steel slab. No particular limitation is imposed on the method for manufacturing the steel material. However, preferably, molten steel is produced using a well-known steel making method such as a converter, and a steel slab having prescribed dimensions is obtained by a well-known casting method such as a continuous casting method or an ingot casting-slabbing method. The obtained steel material is directly heated without cooling or heated after cooling in a heating furnace. The heating temperature is preferably 1100 to 1300° C. in consideration of a rolling load and oxide scale. No particular limitation is imposed on the heating method, and the steel material may be reheated, for example, in a reheating furnace according to a routine procedure.

Hot Rolling Step

Next, the heated steel material is hot-rolled to obtain a hot-rolled steel sheet. No particular limitation is imposed on the hot rolling, and the hot rolling may be performed according to a routine procedure. No particular limitation is imposed on the cooling after the hot rolling, and the hot-rolled steel sheet is cooled to coiling temperature. Next, the hot-rolled steel sheet is cooled and coiled. The coiling temperature is preferably 400° C. or higher. This is because, when the coiling temperature is 400° C. or higher, the hot-rolled steel sheet can be easily coiled without an increase in the strength of the hot rolled steel sheet. The coiling temperature is more preferably 550° C. or higher. However, the coiling temperature is preferably 750° C. or lower. This is because, when the coiling temperature is 750° C. or lower, a reduction in yield due to the formation of thick scale is prevented. Heat treatment may be performed before pickling for the purpose of softening.

Pickling Step

To completely remove the scale on the coiled hot-rolled steel sheet, the hot-rolled coil is pickled while unwound. No particular limitation is imposed on the pickling method, and the pickling may be performed according to a routine procedure.

Cold Rolling Step

The pickled hot-rolled steel sheet is rinsed to remove the pickling solution and then cold-rolled. No particular limitation is imposed on the cold rolling method, and the cold rolling may be performed according to a routine procedure.

Annealing Step

The cold-rolled steel sheet subjected to cold rolling is annealed in the annealing temperature range of 950 to 1200° C. In the disclosed embodiments, the annealing step is an important process for inhibiting bainite transformation. The cold-rolled steel sheet is generally often annealed at lower than 950° C. to prevent an increase in the diameter of austenite grains. However, in the disclosed embodiments, the annealing temperature is set to 950° C. or higher in order to increase the diameter of the austenite grains. By increasing the diameter of the austenite grains, the amount of austenite grain boundaries serving as nucleation sites of ferrite and bainite can be reduced. Therefore, the formation of ferrite and a coarse bainite microstructure can be prevented. By annealing the cold-rolled steel sheet at 950° C. or higher, boundary segregation of B is facilitated, so that the formation of ferrite and coarse bainite can be prevented. If the annealing temperature is lower than 950° C., the effect of the increase in the austenite grain diameter and the effect of the grain boundary segregation of B cannot be obtained. Therefore, in the disclosed embodiments, the annealing temperature is set to 950° C. or higher and is preferably 970° C. or higher. However, if the annealing temperature exceeds 1200° C., the cost for heating increases. Therefore, in the disclosed embodiments, the annealing temperature is set to 1200° C. or lower and is preferably 1180° C. or lower.

Cooling Step (when Galvanizing Treatment is not Performed)

When the cold-rolled steel sheet is not subjected to galvanizing treatment, cooling is performed as follows. The cooling is started from the annealing temperature. The cold-rolled steel sheet is cooled at an average cooling rate of 15° C./s or higher in the temperature range of from the Ar3 temperature or higher to the Ms temperature or lower, and the cooling is stopped at cooling stop temperature equal to or lower than the Ms temperature. In the disclosed embodiments, to facilitate martensitic transformation after the cooling, the average cooling rate in the temperature range of from the Ar3 temperature or higher to the Ms temperature or lower is set to 15° C./s or higher. If the average cooling rate is less than 15° C./s or the temperature range is outside the range of disclosed embodiments, ferrite and coarse bainite are formed during cooling, so that the desired tensile strength, the desired yield ratio, and the desired stretch flangeability are not obtained. The average cooling rate is preferably 20° C./s or higher and is preferably 100° C./s or lower. The Ar3 temperature and the Ms temperature can be determined, for example, using formulas (2) and (3) shown below.

$$Ar3(°C.)=868-396[C]+25[Si]-68[Mn]-21[Cu]-55[Ni]-15[Cr]-80[Mo] \quad (2)$$

$$Ms(°C.)=499-308[C]-10.8[Si]-32.4[Mn]-16.2[Ni]-27[Cr]-10.8[Mo] \quad (3)$$

Each of the symbols of elements in the above formulas is the content (% by mass) of the element in the cold-rolled steel sheet, and the content of an element not contained in the cold-rolled steel sheet is set to zero.

First Cooling Step, Galvanizing Step, and Second Cooling Step (when Galvanizing Treatment is Performed)

In the disclosed embodiments, the cold-rolled steel sheet may be subjected to galvanizing treatment. When the cold-rolled steel sheet is subjected to the galvanizing treatment, the first cooling step of cooling the cold-rolled steel sheet subjected to the annealing step at an average cooling rate of 15° C./s or higher in the temperature range of from the Ar3 temperature or higher to 450° C., the galvanizing step of subjecting the steel sheet cooled in the first cooling step to galvanizing treatment, and the second cooling step of cooling the galvanized steel sheet to the Ms temperature or lower at an average cooling rate of 15° C./s or higher are performed sequentially.

(First Cooling Step)

The annealed steel sheet is cooled at an average cooling rate of 15° C./s or higher in the temperature range of from the Ar3 temperature or higher to 450° C. If the cold-rolled steel sheet before the galvanization is cooled to a temperature lower than 450° C., the temperature of a galvanization bath decreases, and deterioration in galvanizability occurs. Moreover, if the steel sheet is cooled to 350° C. or lower, martensite is formed before the galvanization, and the martensite formed serves as nuclei of bainite transformation during galvanization. In this case, a coarse bainite microstructure is formed. Therefore, the cooling temperature range in the first cooling step before the galvanization is set to the range of from the Ar3 temperature or higher to 450° C. If the average cooling rate in the first cooling step is less than 15° C./s, ferrite and coarse bainite are formed during cooling, and the desired tensile strength, the desired yield ratio, and the desired stretch flangeability are not obtained. The average cooling rate is preferably 20° C./s or higher and is preferably 100° C./s or lower.

(Galvanizing Step)

After the annealed steel sheet has been cooled to 450° C., the galvanizing treatment is performed. The galvanizing treatment is preferably hot-dip galvanizing treatment. The annealed steel sheet may be immersed in a hot-dip galvanization bath to perform galvanization according to a routine procedure. In the galvanizing step, the temperature of the steel sheet to be immersed in the galvanization bath is higher than the temperature of the bath and is preferably 500° C. or lower.

(Second Cooling Step)

After the galvanizing treatment, the galvanized steel sheet is removed from the galvanizing bath, and the coating weight is adjusted according to a routine procedure. Then the second cooling step of cooling the resulting steel sheet to the Ms temperature or lower is performed. The second cooling step is performed for the purpose of facilitating martensitic transformation, and the average cooling rate in the temperature range of the Ms temperature or lower is set to 15° C./s or higher. If the average cooling rate is less than 15° C./s or the cooling stop temperature range is higher than the Ms temperature, ferrite and coarse bainite are formed during cooling, and the desired tensile strength, the desired yield ratio, and the desired stretch flangeability are not obtained. The average cooling rate is preferably 20° C./s or higher and is preferably 100° C./s or less.

Galvannealing Step

When a hot-dip galvannealed steel sheet is obtained, a galvannealing step of performing galvannealing treatment after the coating weight is adjusted according to a routine procedure may be provided. When the galvannealing treatment is performed, the second cooling step (cooling at an average cooling rate of 15° C./s or higher in the temperature range of the Ms temperature or lower) may be performed after the galvannealing step. Preferably, the galvannealing treatment is performed by holding the steel sheet in the temperature range of 450 to 600° C. for 1 to 100 seconds.

EXAMPLES

Steel having a chemical composition shown in Table 1 with the balance being Fe and incidental impurities was produced using a converter and formed into a slab. The obtained slab is reheated, hot-rolled, coiled into a coil at a temperature shown in Table 2. Then, while the hot-rolled coil was unwound, the hot-rolled steel sheet was subjected to pickling treatment and then cold-rolled. The thickness of the hot-rolled steel sheet was 3.0 mm, and the thickness of the cold-rolled steel sheet was 1.4 mm. The annealing was performed in a continuous hot-dip galvanizing line under conditions shown in Table 2, and a cold-rolled steel sheet, a hot-dip galvanized steel sheet (GI), or a hot-dip galvannealed steel sheet (GA) was obtained. The hot-dip galvanized steel sheet was obtained by immersing the cold-rolled steel sheet in a galvanizing bath at 460° C., and the coating weight was adjusted to 35 to 45 g/m². The hot-dip galvannealed steel sheet was produced by adjusting the coating weight of the hot-dip galvanized steel sheet as described above and subjecting it to galvannealing treatment in which the resulting steel sheet was held at 460 to 560° C. for 1 to 60 seconds.

(Evaluation of Mechanical Properties)

Each of the obtained steel sheets was subjected to a tensile test according to JIS Z 2241. A JIS No. 5 test specimen was cut out from the steel sheet in a direction orthogonal to the rolling direction, and the tensile test was performed to measure yield strength (YS) and tensile strength (TS). In the disclosed embodiments, when the TS was 1180 MPa or more, the TS was rated good. When the yield ratio (YR=YS/TS) was 70% or more, the yield ratio was rated good.

The stretch flangeability was evaluated by a hole expansion test according to JIS Z 2256 as follows. A 100 mm×100 mm test specimen was cut out, and a hole with a diameter of 10 mm was punched with a clearance of 12.5%. With the steel sheet pressed at a blank holding force of 9 t using a die with an inner diameter of 75 mm, a conical punch with a vertex angle of 60° was pressed into the hole, and the diameter of the hole when cracking occurred was measured. Then the hole expansion ratio λ was determined as the ratio of the expanded hole diameter to the hole diameter before the test. In the disclosed embodiments, when λ was 30% or more, the stretch flangeability was rated good.

(Observation of Microstructure)

A thicknesswise cross section of each of the steel sheets that was parallel to the rolling direction was polished and etched with 3% nital, and SEM images of the microstructure at positions located at ¼ of the sheet thickness were taken in three viewing fields at a magnification of 2000×. The total area fraction of martensite and bainite was determined by image analysis, and the average for the three viewing fields was used as the area fraction of the microstructure.

Bainite grains having an area of 3 μm² or more were identified as follows. A thicknesswise cross section of each steel sheet that was parallel to the rolling direction was polished to a mirror finish using alumina, and the surface of the cross section was cleaned using a plasma cleaner. Then a quantitative carbon mapping image of a 100 μm×100 μm region was measured using an EPMA (device type JXA8530F manufactured by JEOL Ltd.). The conditions for the EPMA measurement are shown below. When the analysis time for one viewing field is long, hydrocarbon-based contamination adheres to the surface of the measurement region, and correct carbon mapping cannot be performed. Therefore, measurement was performed on four 50 μm×50 μm viewing fields.

Acceleration voltage: 7 kV
Beam diameter: 10 nm
Current value: 50 nA
Measurement intervals: 200 nm
Quantitative method: calibration curve method Next, the quantitative carbon mapping image was subjected to smoothing processing. The resulting quantitative carbon mapping image was binarized with 0.7[C] ([C]: C content (% by mass)) as a threshold value of the carbon concentration and then subjected to image processing (close processing and open processing) to remove noise, and the total number of grains (bainite grains) having an area of 3 μm² or more in the four viewing fields was determined. The total number of grains (bainite grains) having an area of 3 μm² or more in the four viewing fields was divided by the total analysis area of the four viewing fields, that is, 0.01 mm², and the number of bainite grains having an area of 3 μm² or more and contained per 1 mm² was determined.

The results are shown in Table 3.

TABLE 1

| No. | Chemical composition of steel (% by mass) | | | | | | | | | | ([N]/14)/([Ti]/47.9) | Ar3 temperature (° C.) | Ms temperature (° C.) |
| --- | --- | --- | --- | --- | --- | --- | --- | --- | --- | --- | --- | --- | --- |
| | C | Si | Mn | P | S | Al | N | Ti | B | others | | | |
| A | 0.15 | 0.8 | 3.1 | 0.01 | 0.005 | 0.02 | 0.004 | 0.016 | 0.0010 | | 0.86 | 618 | 344 |
| B | 0.28 | 1.5 | 2.9 | 0.01 | 0.003 | 0.01 | 0.003 | 0.017 | 0.0013 | | 0.60 | 597 | 303 |
| C | 0.25 | 1.5 | 3.6 | 0.01 | 0.003 | 0.02 | 0.004 | 0.019 | 0.0000 | | 0.72 | 562 | 289 |
| D | 0.35 | 1.8 | 2.6 | 0.01 | 0.004 | 0.02 | 0.004 | 0.020 | 0.0011 | | 0.68 | 598 | 288 |
| E | 0.06 | 1.0 | 2.9 | 0.01 | 0.003 | 0.02 | 0.004 | 0.021 | 0.0008 | | 0.65 | 672 | 376 |
| F | 0.22 | 0.8 | 2.2 | 0.01 | 0.002 | 0.01 | 0.005 | 0.020 | 0.0013 | | 0.86 | 651 | 351 |
| G | 0.20 | 1.4 | 3.1 | 0.01 | 0.003 | 0.02 | 0.005 | 0.011 | 0.0015 | | 1.56 | 613 | 322 |
| H | 0.24 | 1.5 | 3.4 | 0.01 | 0.002 | 0.02 | 0.003 | 0.015 | 0.0010 | Nb 0.01 | 0.68 | 579 | 299 |
| I | 0.14 | 1.0 | 3.6 | 0.01 | 0.003 | 0.02 | 0.003 | 0.017 | 0.0012 | V 0.05 | 0.60 | 593 | 328 |
| J | 0.19 | 1.2 | 2.8 | 0.01 | 0.003 | 0.01 | 0.004 | 0.019 | 0.0009 | Mo 0.09 | 0.72 | 625 | 336 |
| K | 0.22 | 0.9 | 3.4 | 0.01 | 0.002 | 0.01 | 0.003 | 0.018 | 0.0011 | Cr 0.4 | 0.57 | 566 | 301 |
| L | 0.21 | 1.1 | 3.0 | 0.01 | 0.002 | 0.02 | 0.004 | 0.020 | 0.0008 | Cu 0.2 | 0.68 | 604 | 325 |
| M | 0.13 | 0.6 | 3.8 | 0.01 | 0.003 | 0.01 | 0.004 | 0.018 | 0.0011 | Ni 0.2 | 0.76 | 562 | 326 |
| N | 0.18 | 1.8 | 3.4 | 0.01 | 0.004 | 0.01 | 0.003 | 0.017 | 0.0014 | Ca 0.0050 | 0.60 | 611 | 314 |
| O | 0.23 | 0.9 | 3.0 | 0.01 | 0.003 | 0.01 | 0.003 | 0.018 | 0.0009 | REMs 0.0020 | 0.57 | 595 | 321 |
| P | 0.18 | 0.8 | 2.9 | 0.01 | 0.002 | 0.01 | 0.003 | 0.016 | 0.0016 | Ta 0.020 | 0.64 | 620 | 341 |
| Q | 0.16 | 0.8 | 3.5 | 0.01 | 0.003 | 0.01 | 0.004 | 0.019 | 0.0013 | W 0.12 | 0.72 | 587 | 328 |
| R | 0.20 | 1.0 | 3.2 | 0.01 | 0.003 | 0.02 | 0.003 | 0.019 | 0.0010 | Sn 0.006 | 0.54 | 596 | 323 |
| S | 0.19 | 1.5 | 2.9 | 0.01 | 0.004 | 0.01 | 0.004 | 0.021 | 0.0015 | Sb 0.008 | 0.65 | 633 | 330 |
| T | 0.25 | 1.6 | 2.7 | 0.01 | 0.003 | 0.01 | 0.004 | 0.020 | 0.0014 | Co 0.030 | 0.68 | 625 | 317 |
| U | 0.22 | 0.8 | 3.3 | 0.01 | 0.003 | 0.01 | 0.003 | 0.016 | 0.0011 | Zr 0.0040 | 0.64 | 576 | 316 |
| V | 0.22 | 0.7 | 3.0 | 0.01 | 0.003 | 0.01 | 0.004 | 0.017 | 0.0008 | Mg 0.0015 | 0.81 | 594 | 326 |

Underlines mean outside the range of the disclosed embodiments.

TABLE 2

| Steel sheet No. | Steel | Coiling temperature (° C.) | Annealing temperature (° C.) | Galvanization | Average cooling rate in temperature range of from Ar3 temperature or higher to Ms temperature or lower when no galvanization was performed (° C./s) | Average cooling rate in temperature range of from Ar3 temperature or higher to 450° C. in first cooling step (° C./s) | Average cooling rate in temperature range of Ms temperature or lower in second cooling step (° C./s) | Remarks |
|---|---|---|---|---|---|---|---|---|
| 1 | A | 650 | 1020 | No | 30 | — | — | Example |
| 2 | A | 660 | 910 | No | 30 | — | — | Comparative Example |
| 3 | A | 680 | 1100 | GI | — | 30 | 50 | Example |
| 4 | A | 660 | 1080 | GI | — | 40 | 10 | Comparative Example |
| 5 | B | 630 | 980 | GA | — | 10 | 30 | Comparative Example |
| 6 | B | 650 | 1050 | GA | — | 30 | 50 | Example |
| 7 | B | 680 | 1040 | GI | — | 40 | 50 | Example |
| 8 | C | 640 | 1020 | GI | — | 30 | 50 | Comparative Example |
| 9 | D | 700 | 990 | GI | — | 30 | 50 | Comparative Example |
| 10 | E | 720 | 1150 | GA | — | 30 | 50 | Comparative Example |
| 11 | F | 680 | 1080 | No | 50 | — | — | Comparative Example |
| 12 | G | 700 | 1060 | GI | — | 40 | 50 | Comparative Example |
| 13 | H | 720 | 1160 | GI | — | 30 | 50 | Example |
| 14 | I | 700 | 980 | GI | — | 40 | 50 | Example |
| 15 | J | 690 | 1070 | GA | — | 40 | 50 | Example |
| 16 | K | 650 | 990 | GI | — | 40 | 40 | Example |
| 17 | L | 680 | 1020 | GA | — | 30 | 50 | Example |
| 18 | M | 700 | 1110 | GI | — | 40 | 50 | Example |
| 19 | N | 640 | 1090 | GI | — | 30 | 40 | Example |
| 20 | O | 650 | 970 | GA | — | 30 | 50 | Example |
| 21 | A | 660 | 1020 | No | 8 | — | — | Comparative Example |
| 22 | J | 680 | 1030 | GI | — | 20 | 20 | Example |
| 23 | P | 660 | 1100 | GA | — | 40 | 40 | Example |
| 24 | Q | 620 | 1050 | GA | — | 40 | 50 | Example |
| 25 | R | 660 | 980 | No | 50 | — | — | Example |
| 26 | S | 680 | 1080 | GA | — | 40 | 40 | Example |
| 27 | T | 680 | 1120 | GA | — | 30 | 40 | Example |
| 28 | U | 670 | 1060 | GA | — | 40 | 50 | Example |
| 29 | V | 650 | 1080 | GA | — | 40 | 40 | Example |

Underlines mean outside the range of the disclosed embodiments.

TABLE 3

| Steel sheet No. | Steel | Total aera fraction of martensite and bainite (%) | Bainite grains having area of 3 μm² or more and carbon concentration of less than 0.7[C] (grains/mm²) | TS (MPa) | YR (%) | λ (%) | Remarks |
|---|---|---|---|---|---|---|---|
| 1 | A | 99 | 800 | 1261 | 82 | 42 | Example |
| 2 | A | 99 | 1600 | 1254 | 63 | 28 | Comparative Example |
| 3 | A | 99 | 400 | 1275 | 84 | 36 | Example |
| 4 | A | 99 | 1800 | 1089 | 63 | 24 | Comparative Example |
| 5 | B | 93 | 1600 | 1129 | 60 | 22 | Comparative Example |
| 6 | B | 99 | 600 | 1506 | 82 | 33 | Example |
| 7 | B | 99 | 600 | 1524 | 78 | 38 | Example |
| 8 | C | 94 | 2400 | 1453 | 62 | 19 | Comparative Example |
| 9 | D | 94 | 1000 | 1528 | 58 | 18 | Comparative Example |
| 10 | E | 93 | 3000 | 946 | 62 | 24 | Comparative Example |
| 11 | F | 92 | 2700 | 1100 | 60 | 21 | Comparative Example |
| 12 | G | 99 | 1800 | 1392 | 64 | 26 | Comparative Example |
| 13 | H | 99 | 900 | 1464 | 79 | 32 | Example |
| 14 | I | 99 | 900 | 1320 | 82 | 36 | Example |
| 15 | J | 99 | 300 | 1407 | 78 | 36 | Example |
| 16 | K | 99 | 700 | 1477 | 75 | 34 | Example |

TABLE 3-continued

| Steel sheet No. | Steel | Total aera fraction of martensite and bainite (%) | Bainite grains having area of 3 μm² or more and carbon concentration of less than 0.7[C] (grains/mm²) | TS (MPa) | YR (%) | λ (%) | Remarks |
|---|---|---|---|---|---|---|---|
| 17 | L | 99 | 600 | 1513 | 72 | 31 | Example |
| 18 | M | 99 | 500 | 1226 | 79 | 39 | Example |
| 19 | N | 99 | 1000 | 1342 | 82 | 44 | Example |
| 20 | O | 99 | 900 | 1294 | 77 | 45 | Example |
| 21 | A | 94 | 2400 | 1113 | 64 | 22 | Comparative Example |
| 22 | J | 99 | 600 | 1392 | 80 | 45 | Example |
| 23 | P | 99 | 500 | 1302 | 77 | 36 | Example |
| 24 | Q | 99 | 600 | 1264 | 80 | 40 | Example |
| 25 | R | 99 | 600 | 1429 | 76 | 44 | Example |
| 26 | S | 99 | 500 | 1377 | 78 | 41 | Example |
| 27 | T | 99 | 900 | 1536 | 77 | 37 | Example |
| 28 | U | 99 | 1000 | 1492 | 72 | 33 | Example |
| 29 | V | 99 | 700 | 1511 | 74 | 33 | Example |

Underlines mean outside the range of the disclosed embodiments.

In each Example, the tensile strength was 1180 MPa or more, the yield ratio was 70% or more, and the hole expansion ratio was 30% or more. However, in each Comparative Example, at least one of the tensile strength, the yield ratio, and the hole expansion ratio was poor.

The invention claimed is:

1. A high-strength cold-rolled steel sheet having a chemical composition comprising, by mass %:
C: 0.10 to 0.30%;
Si: 0.50 to 2.00%;
Mn: 2.5 to 4.0%;
P: 0.050% or less;
S: 0.020% or less;
Al: 0.10% or less;
N: 0.01% or less;
Ti: 0.100% or less;
B: 0.0003 to 0.0030%; and
the balance being Fe and incidental impurities,
wherein N and Ti satisfy formula (1):

$$([N]/14)/([Ti]/47.9)<1 \quad (1)$$

where [N] and [Ti] are contents, by mass %, of N and Ti, respectively,
a total area fraction of martensite and bainite is 95% or more,
a number density of bainite grains having an area of 3 μm² or more and a carbon concentration of less than 0.7[C] is 1200 grains/mm² or less, where [C] is a content, by mass %, of C, and
the steel sheet has a hole expansion ratio of 30% or more.

2. The high-strength cold-rolled steel sheet according to claim 1, wherein the chemical composition further comprises, by mass %, at least one selected from the group consisting of Nb: 0.001 to 0.020%, V: 0.001 to 0.100%, Mo: 0.010 to 0.500%, Cr: 0.01 to 1.00%, Cu: 0.01 to 1.00%, Ni: 0.01 to 0.50%, Ca: 0.0001 to 0.0200%, and REM: 0.0001 to 0.0200%.

3. The high-strength cold-rolled steel sheet according to claim 1, wherein the chemical composition further comprises, by mass %, at least one selected from the group consisting of Nb: 0.020% or less, V: 0.100% or less, Mo: 0.500% or less, Cr: 1.00% or less, Cu: 1.00% or less, Ni: 0.50% or less, Ta: 0.100% or less, W: 0.500% or less, Sn: 0.200% or less, Sb: 0.200% or less, Co: 0.100% or less, Zr: 0.0200% or less, Ca: 0.0200% or less, Mg: 0.0200% or less, and REM: 0.0200% or less.

4. The high-strength cold-rolled steel sheet according to claim 1, wherein the high-strength cold-rolled steel sheet has a galvanized layer on a surface thereof.

5. A method for manufacturing the high-strength cold-rolled steel sheet according to claim 1, the method comprising:
a hot rolling step of subjecting a steel material having the chemical composition to hot rolling to obtain a hot-rolled steel sheet;
a pickling step of subjecting the hot-rolled steel sheet to pickling;
cold rolling step of subjecting the pickled hot-rolled steel sheet to cold rolling to obtain a cold-rolled steel sheet;
an annealing step of annealing the cold-rolled steel sheet at an annealing temperature in a range of 950 to 1200° C.; and
a cooling step of starting cooling from the annealing temperature, the cooling being performed at an average cooling rate of 15° C./s or higher in a temperature range of from Ar3 temperature or higher to Ms temperature or lower.

6. A method for manufacturing the high-strength cold-rolled steel sheet according to claim 1, the method comprising:
a hot rolling step of subjecting a steel material having the chemical composition to hot rolling to obtain a hot-rolled steel sheet;
a pickling step of subjecting the hot-rolled steel sheet to pickling;
a cold rolling step of subjecting the pickled hot-rolled steel sheet to cold rolling to obtain a cold-rolled steel sheet;
an annealing step of annealing the cold-rolled steel sheet at an annealing temperature in a range of 950 to 1200° C.;
a first cooling step of starting cooling from the annealing temperature, the cooling being performed at an average cooling rate of 15° C./s or higher in a temperature range of from Ar3 temperature or higher to 450° C.;
a galvanizing step of subjecting the cooled cold-rolled steel sheet to galvanizing treatment; and
a second cooling step of, after the galvanizing step, performing cooling at an average cooling rate of 15° C./s or higher in a temperature range of Ms temperature or lower.

7. The method for manufacturing a high-strength cold-rolled steel sheet according to claim 6, the method further comprising a galvannealing step of, after the galvanizing step and before the second cooling step, performing galvannealing treatment.

8. The high-strength cold-rolled steel sheet according to claim 2, wherein the high-strength cold-rolled steel sheet has a galvanized layer on a surface thereof.

9. The high-strength cold-rolled steel sheet according to claim 3, wherein the high-strength cold-rolled steel sheet has a galvanized layer on a surface thereof.

10. A method for manufacturing the high-strength cold-rolled steel sheet according to claim 2, the method comprising:
  a hot rolling step of subjecting a steel material having the chemical composition to hot rolling to obtain a hot-rolled steel sheet;
  a pickling step of subjecting the hot-rolled steel sheet to pickling;
  cold rolling step of subjecting the pickled hot-rolled steel sheet to cold rolling to obtain a cold-rolled steel sheet;
  an annealing step of annealing the cold-rolled steel sheet at an annealing temperature in a range of 950 to 1200° C.; and
  a cooling step of starting cooling from the annealing temperature, the cooling being performed at an average cooling rate of 15° C./s or higher in a temperature range of from Ar3 temperature or higher to Ms temperature or lower.

11. A method for manufacturing the high-strength cold-rolled steel sheet according to claim 3, the method comprising:
  a hot rolling step of subjecting a steel material having the chemical composition to hot rolling to obtain a hot-rolled steel sheet;
  a pickling step of subjecting the hot-rolled steel sheet to pickling;
  cold rolling step of subjecting the pickled hot-rolled steel sheet to cold rolling to obtain a cold-rolled steel sheet;
  an annealing step of annealing the cold-rolled steel sheet at an annealing temperature in a range of 950 to 1200° C.; and
  a cooling step of starting cooling from the annealing temperature, the cooling being performed at an average cooling rate of 15° C./s or higher in a temperature range of from Ar3 temperature or higher to Ms temperature or lower.

12. A method for manufacturing the high-strength cold-rolled steel sheet according to claim 2, the method comprising:
  a hot rolling step of subjecting a steel material having the chemical composition to hot rolling to obtain a hot-rolled steel sheet;
  a pickling step of subjecting the hot-rolled steel sheet to pickling;
  a cold rolling step of subjecting the pickled hot-rolled steel sheet to cold rolling to obtain a cold-rolled steel sheet;
  an annealing step of annealing the cold-rolled steel sheet at an annealing temperature in a range of 950 to 1200° C.;
  a first cooling step of starting cooling from the annealing temperature, the cooling being performed at an average cooling rate of 15° C./s or higher in a temperature range of from Ar3 temperature or higher to 450° C.;
  a galvanizing step of subjecting the cooled cold-rolled steel sheet to galvanizing treatment; and
  a second cooling step of, after the galvanizing step, performing cooling at an average cooling rate of 15° C./s or higher in a temperature range of Ms temperature or lower.

13. A method for manufacturing the high-strength cold-rolled steel sheet according to claim 3, the method comprising:
  a hot rolling step of subjecting a steel material having the chemical composition to hot rolling to obtain a hot-rolled steel sheet;
  a pickling step of subjecting the hot-rolled steel sheet to pickling;
  a cold rolling step of subjecting the pickled hot-rolled steel sheet to cold rolling to obtain a cold-rolled steel sheet;
  an annealing step of annealing the cold-rolled steel sheet at an annealing temperature in a range of 950 to 1200° C.;
  a first cooling step of starting cooling from the annealing temperature, the cooling being performed at an average cooling rate of 15° C./s or higher in a temperature range of from Ar3 temperature or higher to 450° C.;
  a galvanizing step of subjecting the cooled cold-rolled steel sheet to galvanizing treatment; and
  a second cooling step of, after the galvanizing step, performing cooling at an average cooling rate of 15° C./s or higher in a temperature range of Ms temperature or lower.

14. The method for manufacturing a high-strength cold-rolled steel sheet according to claim 12, the method further comprising a galvannealing step of, after the galvanizing step and before the second cooling step, performing galvannealing treatment.

15. The method for manufacturing a high-strength cold-rolled steel sheet according to claim 13, the method further comprising a galvannealing step of, after the galvanizing step and before the second cooling step, performing galvannealing treatment.

16. The high-strength cold-rolled steel sheet according to claim 1, wherein the steel sheet has a yield ratio of 70% or more.

* * * * *